United States Patent [19]
Aldrich et al.

[11] Patent Number: 4,534,858
[45] Date of Patent: Aug. 13, 1985

[54] SIFTER

[75] Inventors: Warren S. Aldrich, 1965 Old Dominion Dr., Dunwoody, Ga. 30338; Brian Ingersoll, Marietta, Ga.

[73] Assignee: Warren Aldrich, Dunwoody, Ga.

[21] Appl. No.: 616,905

[22] Filed: Jun. 4, 1984

[51] Int. Cl.³ .......................... B07B 1/02; B07B 1/28
[52] U.S. Cl. .................................. 209/236; 209/333; 209/365 R; 209/374; 209/371; 209/249; 220/298; 220/302; 7/110; 30/122; 30/272 R; 210/471
[58] Field of Search .................. 209/236, 333, 365 R, 209/374, 237, 309, 337, 371, 372, 364, 249; 30/272 A, 272 R, 122; 7/110, 158, 167; 220/298, 301, 302; 55/357; 210/471, 470

[56] References Cited

U.S. PATENT DOCUMENTS

| | | | |
|---|---|---|---|
| D. 266,819 | 11/1982 | Doyel | D7/47 |
| 924,491 | 6/1909 | Nesbitt | 209/236 |
| 1,000,830 | 8/1911 | Mahoney | 209/337 X |
| 1,455,660 | 5/1923 | Ranz | 209/374 |
| 1,833,928 | 12/1931 | Bell | 220/302 |
| 2,074,162 | 3/1937 | Bowman | 209/251 |
| 2,521,034 | 9/1950 | Bond | 209/358 |
| 2,537,852 | 1/1951 | Peterson | 207/355 |
| 3,063,563 | 11/1962 | Winchell | 209/283 |
| 3,736,614 | 6/1973 | Crostic et al. | 30/272 A X |
| 3,964,646 | 6/1976 | Yazawa et al. | 209/332 X |
| 4,164,813 | 8/1979 | Dittert et al. | 30/272 A |

Primary Examiner—Tim Miles
Assistant Examiner—Thomas M. Lithgow
Attorney, Agent, or Firm—Thomas & Kennedy

[57] ABSTRACT

A sifter has a casing that is detachably coupled with a screen unit that also has a casing. A sifter handle is configured for detachable coupling to a conventional electric knife drive.

8 Claims, 6 Drawing Figures

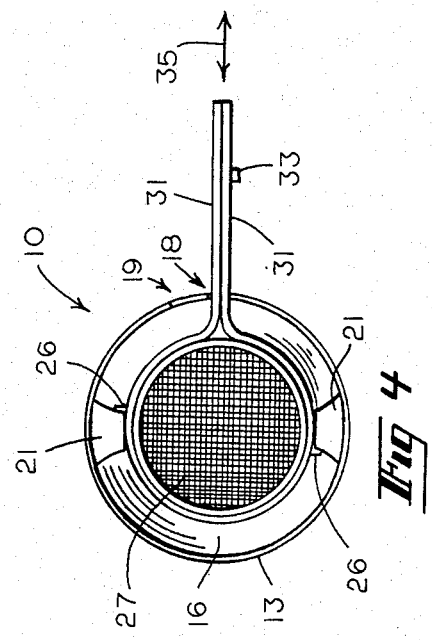
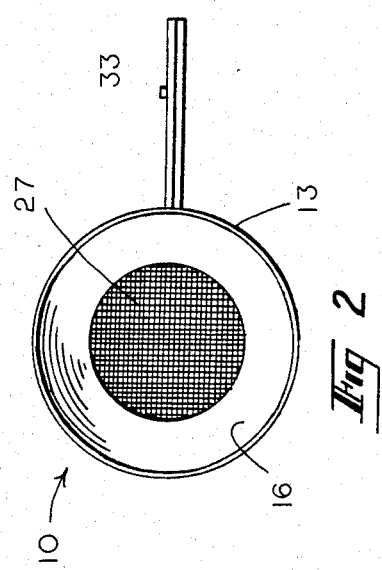
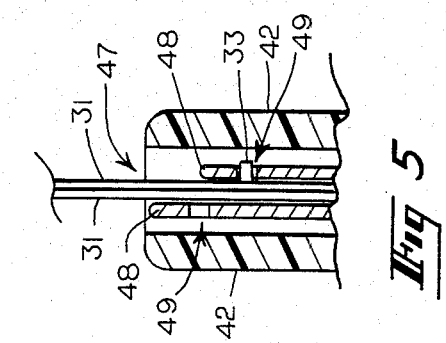
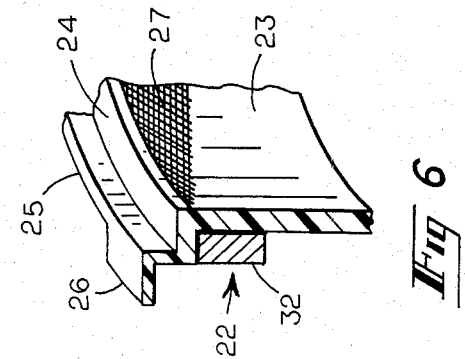
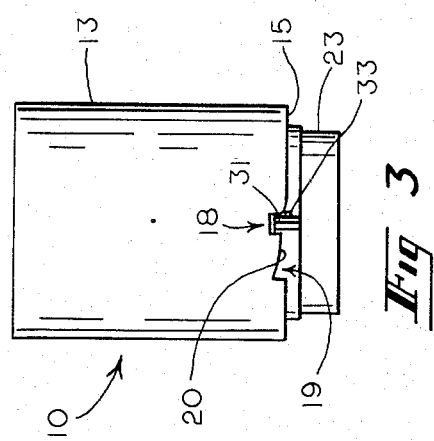

SIFTER

TECHNICAL FIELD

This invention relates to sifters of the type adapted to be driven by an electric motor.

BACKGROUND OF THE INVENTION

For many years it has been a common practice to sift flour and similar granulated or powdery food ingredients, such as powdered sugar, preparatory to or following baking. Such sifting is typically done by shaking a supply of the ingredient disposed atop a sieve or screen of a type having small interstices. Sifters of such simple construction are comprised merely of a tubular casing, a screen mounted at the bottom of the casing and a handle. In use the casing is filled or partially filled with flour or the like and the loaded sifter then manually shaken whereupon the flour is sifted through the screen and any unsifted residue discarded. Other sifters of simple construction are designed to permit limited relative movement between the screen and casing. Though these are usually hand drive, they have been provided with electric motor means such as that sifter illustrated in U.S. Pat. No. 266,819.

Since sifting of flour can take a considerable amount of time, leading to manual fatigue, sifters have been devised which have their own electric drive means. Exemplary of such are those shown in U.S. Pat. Nos. 3,063,563 and 3,964,646. Other sifters have been developed for connection to the electric drive means of other types of household appliances. For example, U.S. Pat. Nos. 2,074,162, 2,521,034 and 2,537,852 disclose sifters which are adapted to be detachable coupled with the electric drive of small kitchen appliances of the type that operate while set upon a supporting surface such as a counter top. These other types of appliances have been mixers, beaters and the like such as the famous Mix-Master. These specialty type sifters, however, have met with but limited commercial acceptance due to the costs associated with the construction of their complex coupling mechanisms as well as to their lack of portability, versatility, and to difficulties encountered in cleaning them.

Accordingly, it is seen that a need remains for a sifter of a type which may be readily coupled to the electric drive of a commonly available kitchen appliance which overcomes the just described problems and limitations of the prior art. It is to the fulfillment of such a need that the present invention is therefore primarily directed.

SUMMARY OF THE INVENTION

In one form of the invention a sifter comprises a casing, a screen through which material introduced into the casing may be sifted, and a handle having an end portion provided with coupling means for coupling the handle with an electric knife drive of the type having two juxtaposed drive rods.

In another form of the invention a sifter comprises a tubular casing, a screen assembly detachably mounted to the casing for limited relative movement with respect thereto, and a handle, The casing has a cylindrical outer wall from within which a funnel inwardly extends and from which a support ledge extends. The lower rim of the outer casing wall is formed with a detent notch. The screen assembly has an annular wall to the inside of which a planar screen mesh is mounted and from the outside of which a support ledge extends. A portion of the handle extends radially from the annular screen wall at an axial position relative to the screen support ledge for detentable seating within the casing detent notch with the screen support ledge slidably supported upon the casing support ledge.

BRIEF DESCRIPTION OF THE DRAWING

FIG. 2 is a plan view of the sifter shown in FIG. 1.

FIG. 3 is a side elevational view of the sifter shown in FIG. 1.

FIG. 4 is a bottom view of the sifter shown in FIG. 1.

FIG. 5 is a fragmentary view, in cross section, of an end portion of the electric knife drive illustrated in FIG. 1 shown coupled with the handle of the sifter shown in FIG. 1.

FIG. 6 is a fragmentary view, in perspective, of a portion of the sifter shown in FIG. 1.

DETAILED DESCRIPTION

Figure 1:
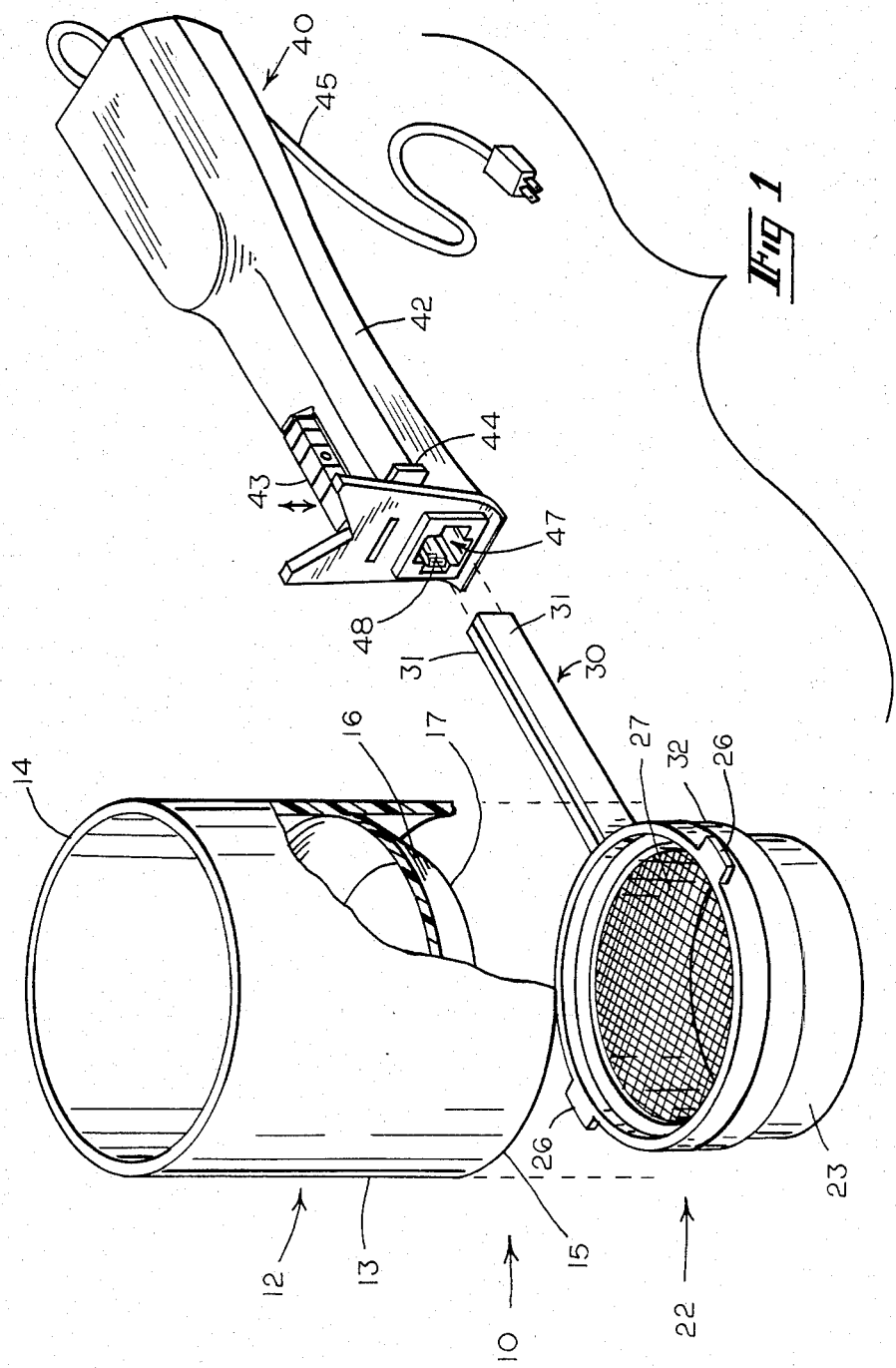
FIG. 1 is an exploded view, in perspective, of a sifter embodying principles of the invention shown positioned adjacent a conventional electric knife drive.

With reference to the drawing, there is shown a sifter 10 having a molded plastic casing 12 that has a hollow, cylindrical, outer wall 13 having an upper rim 14 and a lower rim 15. The casing also has a funnel in the form of a wall 16 of a truncated, conical shape which extends inwardly and downwardly from outer wall 13 to a lower, planar rim 17 located radially inwardly from wall 13 and axially upwardly from the rim 15 of the outer wall. As shown in FIG. 3 a notch 18 is formed in the lower rim 15. Another notch 19 of a saw-toothed shape is also formed in the rim 15 conjoined with the notch 18. The wall 20 of notch 19 provides a camming surface for the sifter handle as hereinafter described. The casing 12 is also seen from FIG. 4 to have two support ledges 21 in the shape of tongues or tabs that extend inwardly from wall 13 towards wall 16 circumferentially spaced 180° from each other and 90° from notch 18 at a height slightly above rim 17.

The sifter is further seen to include a screen assembly indicated generally at 22 which has a hollow, cylindrical wall 23 which may also be considered as constituting another casing, as hereinafter further explained, which also is molded plastic. Thus, taken together with the casing 12 the sifter as a whole may be considered as having a casing segmented into two mutually separatable and operatable casing segments. As best shown in FIG. 6, an upper end portion of the wall 23 is formed with an out-turned flange 24 from which an annular lip 25 upwardly extends. Two support ledges 26, in the shape of tongues or tabs, extend radially outwardly from lip 25 spaced circumferentially 180° apart. A stainless steel wire mesh screen 27 is mounted to the interior of the cylindrical wall 23 at a position slightly beneath the flange 24.

A stainless steel handle, indicated generally at 30, is securely mounted to the screen assembly 22. The handle has two elongated, rod-shaped portions 31 riveted together as by unshown rivets which merge with an annular collar portion 32 that is placed in gripping engagement with the screen assembly wall 23 beneath ledge 24. A single coupling stud 33 projects laterally from one side of one of the elongated handle end portions 31 as best shown in FIG. 4. Other than for this stud the sides of the two rod-shaped handle portions 31 are flat. Though the elongated handle portions 31 are shown here to be comprised of two structural components riveted together, they may, of course, be unitized into a single bar-shaped structure.

The screen assembly with the handle mounted thereto may be easily mounted to the casing 12 by locating the handle 30 within that portion of notch 19 located furtherest from notch 18 and then moving the handle along notch surface 20. As this is done ledges 26 are brought over and slide upon ledges 21 until the handle is seated in notch 18. In this detented rotary position the ledges 26 rest upon ledges 21 without being urged thereagainst by the contact of the handle with the notch 18 since the handle is permitted a higher location within notch 18. At the same time the rim 17 of the funnel wall 16 is positioned just above or in sliding contact upon screen 27 within the bounds of wall 23.

With the screen assembly 22 now mounted to the casing 12 handle 30 may be driven with a reciprocating, linear motion in the direction indicated by arrows 35 with ledges 26 sliding upon ledges 21 and with the inwardly facing edge of ledges 16 in tangential contact with the lip 25. The limits of such reciprocal travel is established by the spacing between the funnel rim 17 and wall 23. During such movement material that has been disposed with the casing 12 is sifted through screen 27. In doing so it is inhibited from escaping radially to ambience by both that portion of the wall 23 located above screen 27 as well as by lip 25. Later, any of the material that may have been deposited onto ledge 24 and against lip 25 may be removed by detaching the screen assembly from the casing and cleaning the two units. Such detachment is easily accomplished by cocking handle 31 slightly downwardly, which motion is permitted by the resilience of the plastic components of the sifter, and moving it upwardly along the camming surface 20 until the ledges 21 and 26 no longer overlap each other enabling the two units to be axially separated.

It should also be pointed out here that the inclusion of annular wall 23 in the screen assembly provides it too with a casing, albeit one not as large as the casing 12. Thus, casing 12 may, for one example, have a four-cup holding capacity and the screen assembly a one-cup holding capacity, when inverted. Thus, sifting may actually be done here with the screen assembly alone, unconnected with the casing 12 for sifting smaller amounts of flour. At other times when the two units are coupled together with the casing 12 atop the screen assembly, the screen assembly wall 23 serves as a baffle or guide for directing the flow of sifted flour.

Thus far a sifter has been described that posesses novel means for releasibly coupling two sifter components of units together for a sifting operation that is accomplished by reciprocating the sifter handle. In accordance with other principles of the invention, the handle is specifically designed as to be releasibly coupled with the conventional electric knife drive indicated generally at 40 in FIG. 1. In this case the drive is that of a popular electric knife manufactured by the General Electric Company (model EK15) which may be positioned with respect to the sifter as shown or inverted from the position illustrated with respect to the sifter. Here the drive is seen to include a housing 42 to which a spring loaded trigger 43 is mounted. Release tabs 44 project from each side of the housing. An unshown electric motor is mounted within the housing 42 which may be coupled to a source of electric current by means of an electric cord 45. A forward end of the drive has an opening 47 in which two drive rods 48 are located, as best shown in FIG. 5, within races that extend inwardly from opening 47. Each drive rod is formed with a detent hole 49 adjacent an end thereof. They are mounted to be driven by the electric motor with a reciprocating linear motion 180° out of phase with each other. Thus, when one drive rod 48 is advanced to the mouth of the opening 47, as shown in FIG. 5, the other drive rod is moved rearwardly toward the interior of the housing 42. In ordinary use two knife blades would be positioned between the two drive rods with each blade coupled to the drive rod adjacent it by means of its coupling stud which extends into the detent hole 49 in that drive rod. The two knife blades are also provided with guide means for holding the two blades side by side as they move with a sliding motion in effecting a cutting action. Here, however, it is seen that the sifter handle 30 is only interlocked with one rather than both of the drive rods by the means of the single coupling stud 33. Nevertheless, the combined thickness of the two rod shaped handle end portions 31 is such as to maintain the handle, in conjunction with the housing races, in sliding contact with both of the drive rods whereby decoupling of the single stud 33 is prevented until such time as such is desired done by actuation of the release button 44. Through this particular electric knife drive is designed so that both of the drive rods reciprocate, such may be designed so that only one drive rod is driven.

It thus is seen that a sifter of novel construction is provided which overcomes limitations and disadvantages of those of prior art sifters. It should be understood, however, that the specifically described embodiment merely illustrates principles of the invention in a perferred form. Many modifications, additions and deletions may therefore be made thereto without departure from the spirit and scope of the invention as set forth in the following claims.

We claim:

1. A sifter comprising a casing, a screen mounted to said casing through which material introduced into said casing may be sifted, and a handle mounted to said screen having an end portion provided with coupling means for coupling said handle with an electric knife drive means of the type having two juxtaposed drive rods such that said screen may be driven by said drive means with a generally linear, reciprocating movement, and wherein said handle end portion is bar-shaped, one side of which is completely flat and the other side of which has a stud projecting outwardly therefrom.

2. The sifter of claim 1 wherein said handle end portion is provided with means for coupling said handle with an electric knife drive means of the type having two juxtaposed blades reciprocally driven along parallel linear paths 180° out of phase with respect to each other.

3. The sifter of claim 1 wherein said handle end portion is bar-shaped and of a thickness approximating the spacing between the two juxtaposed rods of the electric knife drive means.

4. A sifter comprising a casing segmented into first and second segments, a screen rigidly mounted to one of said casing segments through which material introduced into said casing may be sifted, means for releasibly coupling together said first and second casing segments for limited relative movement, and a handle mounted to said screen having an end portion provided with coupling means for coupling said handle with an electric knife drive means of the type having two juxtaposed drive rods such that said screen may be driven by said drive means with a generally linear, reciprocating movement, and wherein said first casing segment has a tubular wall of a selected diameter and said second casing segment has a tubular wall of a diameter less than said selected diameter, and wherein said coupling means include a pair of circumferentially spaced tabs projecting inwardly from said first casing wall and a pair of circumferentially spaced tabs projecting outwardly from said second casing wall and guide means for positioning said first segment pair of tabs and said second segment pair of tabs into and out of overlapped sliding engagement upon one another.

5. The sifter of claim 4 wherein said guide means comprises a first notch in an end of said first segment tubular wall and a second notch in an end of said first segment tubular wall that has a camming surface conjoined with said first notch.

6. A sifter comprising a tubular casing and a screen detachably mounted to said casing for limited relative movement with respect thereto, and a handle, wherein said casing has a cylindrical outer wall from which a conical inner wall inwardly extends and from which a casing ledge radially extends, and with said screen having an annular wall to which a planar screen mesh is mounted and from which a screen ledge radially extends, and wherein said handle extends radially from said annular screen wall at an axial position relative to said screen ledge to be detentable within a casing detent notch with said screen ledge slidably supported upon said casing ledge.

7. The sifter of claim 6 wherein the lower rim of said casing inner wall is in sliding contact with said screen planar mesh.

8. The sifter of claim 6 wherein said handle has coupling means for coupling an end of said handle distal said screen with an electric knife drive means of the type having two juxtaposed drive rods.

* * * * *